US009706191B2

(12) United States Patent
Tu et al.

(10) Patent No.: US 9,706,191 B2
(45) Date of Patent: Jul. 11, 2017

(54) HEAD TRACKING EYEWEAR SYSTEM

(71) Applicant: zSpace, Inc., Sunnyvale, CA (US)

(72) Inventors: Jerome C Tu, Saratoga, CA (US);
David A. Chavez, San Jose, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/187,164

(22) Filed: Jun. 20, 2016

(65) Prior Publication Data
US 2016/0295203 A1  Oct. 6, 2016

Related U.S. Application Data

(63) Continuation of application No. 14/822,384, filed on Aug. 10, 2015, now Pat. No. 9,473,763, which is a continuation of application No. 13/679,630, filed on Nov. 16, 2012, now Pat. No. 9,106,903.

(60) Provisional application No. 61/561,687, filed on Nov. 18, 2011.

(51) Int. Cl.
*H04N 13/04* (2006.01)

(52) U.S. Cl.
CPC ......... *H04N 13/04* (2013.01); *H04N 13/0445* (2013.01); *H04N 13/0468* (2013.01); *H04N 13/0497* (2013.01); *H04N 2213/008* (2013.01)

(58) Field of Classification Search
CPC ............... H04N 13/04; H04N 13/0445; H04N 13/0468; H04N 13/0497
See application file for complete search history.

(56) References Cited

U.S. PATENT DOCUMENTS

| 7,259,747 | B2 * | 8/2007 | Bell ........................ G06F 3/011 345/156 |
| 7,796,134 | B2 | 9/2010 | Vesely |
| 7,907,167 | B2 | 3/2011 | Vesely |
| 8,259,163 | B2 * | 9/2012 | Bell ........................ G06F 3/017 348/51 |
| 8,411,963 | B2 * | 4/2013 | Luff .................. G06K 9/00771 382/103 |
| 8,553,935 | B2 * | 10/2013 | Mandella et al. ..... G01B 21/04 178/18.09 |
| 8,717,360 | B2 | 5/2014 | Vesely |
| 8,717,423 | B2 | 5/2014 | Vesely |

(Continued)

*Primary Examiner* — Amy Hsu
(74) *Attorney, Agent, or Firm* — Meyertons Hood Kivlin Kowert & Goetzel, P.C.; Jeffrey C. Hood; Brian E. Moore

(57) ABSTRACT

In some embodiments, a system for tracking with reference to a three-dimensional display system may include a display device, an image processor, a surface including at least three emitters, at least two sensors, a processor. The display device may image, during use, a first stereo three-dimensional image. The surface may be positionable, during use, with reference to the display device. At least two of the sensors may detect, during use, light received from at least three of the emitters as light blobs. The processor may correlate, during use, the assessed referenced position of the detected light blobs such that a first position/orientation of the surface is assessed. The image processor may generate, during use, the first stereo three-dimensional image using the assessed first position/orientation of the surface with reference to the display. The image processor may generate, during use, a second stereo three-dimensional image using an assessed second position/orientation of the surface with reference to the display.

20 Claims, 5 Drawing Sheets

(56) References Cited

U.S. PATENT DOCUMENTS

| | | | |
|---|---|---|---|
| 2011/0227915 A1* | 9/2011 | Mandella | G01B 21/04 345/419 |
| 2012/0113235 A1* | 5/2012 | Shintani | H04N 13/0022 348/51 |
| 2013/0208098 A1* | 8/2013 | Pujol Alcolado | G06T 7/593 348/47 |

* cited by examiner

HEAD TRACKING EYEWEAR SYSTEM

PRIORITY CLAIM

This application is a continuation of U.S. patent application Ser. No. 14/822,384 entitled "Head Tracking Eyeware System" filed on Aug. 10, 2015 by Jerome C. Tu and David A. Chavez, which is a continuation of U.S. patent application Ser. No. 13/679,630 entitled "Head Tracking Eyeware System" filed on Nov. 16, 2012 by Jerome C. Tu and David A. Chavez, which claims priority to U.S. Provisional Patent Application No. 61/561,687 entitled "HEAD TRACKING USING EYEWEAR WITH FIVE REFLECTOR POINTS" filed on Nov. 18, 2011 by Jerome C. Tu and David A. Chavez, each of which is incorporated by reference herein.

RELATED APPLICATIONS

This application is related to U.S. patent application Ser. No. 13/019,384, entitled "MODIFYING PERSPECTIVE OF STEREOSCOPIC IMAGES BASED ON CHANGES IN USER VIEWPOINT" filed Feb. 2, 2011, which is a continuation-in-part of U.S. patent application Ser. No. 11/429,829, entitled "THREE DIMENSIONAL HORIZONTAL PERSPECTIVE WORKSTATION" filed May 8, 2006, which claims priority to U.S. Provisional Patent Application No. 60/679,633, entitled "THREE DIMENSIONAL HORIZONTAL PERSPECTIVE WORKSTATION" filed May 9, 2005, each of which are incorporated by reference herein. This application is related to U.S. Patent Application No. 61/426,448, entitled "THREE-DIMENSIONAL TRACKING OF OBJECTS IN A 3-D SCENE" filed Dec. 22, 2010, which is incorporated by reference herein. This application is related to U.S. Patent Application Ser. No. 61/426,451, entitled "THREE-DIMENSIONAL COLLABORATION" filed Dec. 22, 2010, which is incorporated by reference herein.

BACKGROUND OF THE INVENTION

1. Field of the Invention

The present disclosure generally relates to tracking systems. More particularly, the disclosure generally relates to systems and methods for tracking a position of a human head in relation to a display system.

2. Description of the Relevant Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. The answer is three dimensional illusions. The two dimensional pictures must provide a number of cues of the third dimension to the brain to create the illusion of three dimensional images. This effect of third dimension cues can be realistically achievable due to the fact that the brain is quite accustomed to it. The three dimensional real world is always and already converted into a two dimensional (e.g. height and width) projected image at the retina, a concave surface at the back of the eye. And from this two dimensional image, the brain, through experience and perception, generates the depth information to form the three dimensional visual image from two types of depth cues: monocular (one eye perception) and binocular (two eye perception). In general, binocular depth cues are innate and biological while monocular depth cues are learned and environmental.

Perspective drawing, together with relative size, is most often used to achieve the illusion of three dimensional depth and spatial relationships on a flat (two dimensional) surface. Of special interest is the most common type of perspective, called central perspective. Central perspective, also called one-point perspective, is the simplest kind of "genuine" perspective construction, and is often taught in art and drafting classes for beginners. Using central perspective, the chess board and chess pieces look like three dimensional objects, even though they are drawn on a two dimensional flat piece of paper. Central perspective has a central vanishing point, and rectangular objects are placed so their front sides are parallel to the picture plane. The depth of the objects is perpendicular to the picture plane. All parallel receding edges run towards a central vanishing point. The viewer looks towards this vanishing point with a straight view. When an architect or artist creates a drawing using central perspective, he must use a single-eye view. That is, the artist creating the drawing captures the image by looking through only one eye, which is perpendicular to the drawing surface.

The vast majority of images, including central perspective images, are displayed, viewed and captured in a plane perpendicular to the line of vision. Viewing the images at an angle different from 90° would result in image distortion, meaning a square would be seen as a rectangle when the viewing surface is not perpendicular to the line of vision.

Central perspective is employed extensively in 3D computer graphics, for a myriad of applications, such as scientific, data visualization, computer-generated prototyping, special effects for movies, medical imaging, and architecture, to name just a few. One of the most common and well-known 3D computing applications is 3D gaming, which is used here as an example, because the core concepts used in 3D gaming extend to all other 3D computing applications.

There is a little known class of images called "horizontal perspective" where the image appears distorted when viewing head on, but displays a three dimensional illusion when viewing from the correct viewing position. In horizontal perspective, the angle between the viewing surface and the line of vision is preferably 45°, but can be almost any angle, and the viewing surface is preferably horizontal (thus the name "horizontal perspective"), but can be any surface, as long as the line of vision forms a non-perpendicular angle to it.

Horizontal perspective images offer realistic three dimensional illusions, but are little known primarily due to the narrow viewing location (the viewer's eyepoint has to coincide precisely with the image projection eyepoint) and the complexity involved in projecting the two dimensional image or the three dimension model into the horizontal perspective image.

The generation of horizontal perspective images requires considerably more expertise to create than conventional perpendicular images. The conventional perpendicular images can be produced directly from the viewer or camera point. One need simply open one's eyes or point the camera in any direction to obtain the images. Further, with much experience in viewing three dimensional depth cues from perpendicular images, viewers can tolerate a significant amount of distortion generated by the deviations from the camera point. In contrast, the creation of a horizontal perspective image does require much manipulation. Conventional cameras, by projecting the image into the plane perpendicular to the line of sight, would not produce a horizontal perspective image. Making a horizontal drawing requires much effort and is very time consuming. Further, since humans have limited experience with horizontal perspective images, the viewer's eye must be positioned precisely where the projection eyepoint point is in order to avoid image distortion. A system which tracked a viewer's eye relative to a horizontal display might then adjust the projection eyepoint point to minimize or avoid image distortion.

Conventional head tracking system are adequate for recognizing a change in the head position, but are not precise for precise operations applied to a personal workstation. Furthermore, as a user moves their head to one side or another for look-around capabilities, The norm of using two reflector points could lose recognition of one of the two reflector points (the turn of the head may move one of the reflector point out of view of the camera detector).

Another major problem in reflector based head tracking is false positives. this is where there may be more reflections detected by the sensor than are intended to be identified. As an example in using eyewear, the reflectors are to reflect the intended infrared (IR) light, but additional reflections off the glass surfaces of the eyewear may be detected by the camera sensor and be interpreted as incorrect intended reflections and therefore confuse the positioning detection system.

Therefore a system and/or method which better results in tracking of the position of the head or more precisely, where the eyes are on the head, would further insure the perspective of the viewer to the display is correctly maintained and would be highly desirable.

SUMMARY

This disclosure describes systems and methods for, in some embodiments, tracking with reference to a three-dimensional display system may include a display device. The display device may image, during use, a first stereo three-dimensional image. The system may include an image processor. The system may include a surface including at least three emitters. The surface may be positionable, during use, with reference to the display device. The system may include at least two sensors. The sensors may be coupled to the display device in a known position and orientation with reference to the display device. At least two of the sensors may detect, during use, light received from at least three of the emitters as light blobs when the light blobs from the at least three emitters of the surface are detected substantially in proximity to the display device during use.

The system may include a processor coupled to at least two of the sensors. The processor may assess, during use, a referenced position of the detected light blobs using a bounding function for each of at least two of the sensors. The processor may correlate, during use, the assessed referenced position of the detected light blobs for each of at least two of the sensors such that a first position/orientation of the surface with reference to the display device is assessed. The image processor may generate, during use, the first stereo three-dimensional image using the assessed first position/orientation of the surface with reference to the display. The image processor may generate, during use, a second stereo three-dimensional image using an assessed second position/orientation of the surface with reference to the display.

BRIEF DESCRIPTION OF THE DRAWINGS

Advantages of the present invention may become apparent to those skilled in the art with the benefit of the following detailed description of the preferred embodiments and upon reference to the accompanying drawings.

Figure 1:
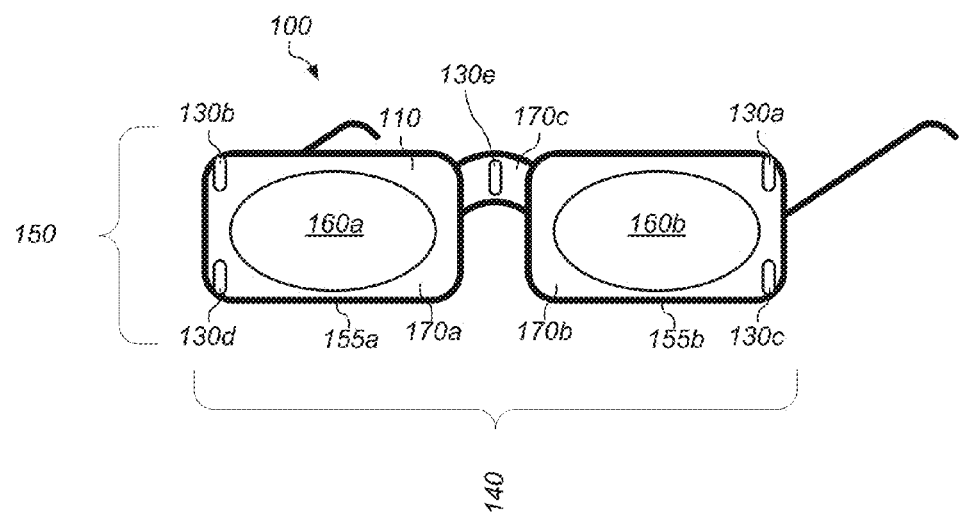
FIG. 1 depicts a diagram of a view of an embodiment of a tracking device for tracking a head of a user relative to a display system.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

\* \* \*

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified.

Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "blob" as used herein generally refers to a sensor detected signal (e.g., reflection). The blob may be somewhat circular.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "emitter" as used herein generally refers to a device which projects a signal (e.g., light, infrared light, etc.). The emitter may be active (i.e., the signal originates from the emitter) or the emitter may be passive (i.e., the signal originate from somewhere other than the emitter and is, for example, reflected off the emitter).

The term "eyepoint" as used herein generally refers to the physical viewpoint of a single eye or a pair of eyes. A viewpoint above may correspond to the eyepoint of a person. For example, a person's eyepoint in the physical space has a corresponding viewpoint in the virtual space.

The term "head tracking" as used herein generally refers to tracking the position/orientation of the head in a volume. This allows the user to "look around" a virtual reality environment simply by moving the head without the need for a separate controller to change the angle of the imagery.

The term "position/orientation" as used herein generally refers maybe referred to herein as a position, but may be understood to mean position/orientation in at least 2 degrees of freedom (e.g., one dimension position and one dimension orientation . . . X, rotation). Position/orientation may be relative or absolute, as desired. Position/orientation may also include yaw, pitch, and roll information, e.g., when defining the orientation of a viewpoint.

The term "referenced" as used herein generally refers to a known and/or calculated (e.g., to a processor) precise position/orientation relation of a first object(s) (e.g., a sensor) to a second object(s) (e.g., a display device). The relationship, in some embodiments, may be predetermined in that the relationship is fixed (e.g. physically fixed as in using precision spatial mounts) such that the relationship is not adjustable after initial assembly (e.g., wherein the first object and the second object are assembled together as part of a single device). The relationship, in some embodiments, may be determined, during use, through a process (e.g., an initialization process, which may include a calibration and/or measurement process) which determines a precise spatial position/orientation relation of the first object(s) (e.g., a sensor) to the second object(s) (e.g., a display device).

The term "sensor" as used herein generally refers to a converter that measures a physical quantity and converts it into a signal which can be read by an observer or by an instrument. Sensors may include cameras, photo detectors, electronic sensors, CMOS or CCD sensors, etc.

The term "viewpoint" as used herein generally has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint. The term "virtual viewpoint" refers to a viewpoint from within a virtual representation or 3D scene.

This disclosure describes systems and methods for, in some embodiments, tracking a head of a user relative to a display system may include tracking device 100 which couples, during use, to a head of a user. In some embodiments, the tracking device may include eyewear, headwear, armwear, handwear, object cover and/or other device that is to correlate to some object to be tracked. The tracking device may include first side 110, second side 120, and at least three emitters 130. The second side may be opposite the first side. The second side may be directed, during use, towards the head of the user. The at least three emitters may be positioned on the first side of the tracking device.

Figure 2:
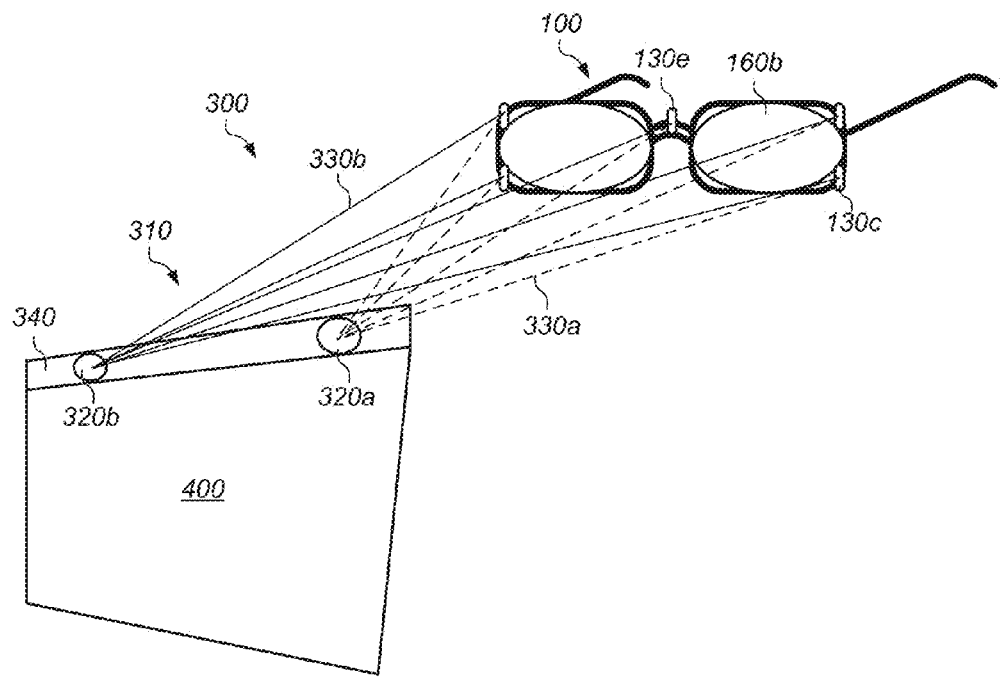
FIG. 2 depicts a diagram of a perspective view of an embodiment of a system for tracking a head of a user relative to a display system wherein light is detected emanating from all of the emitters.
Figure 3:
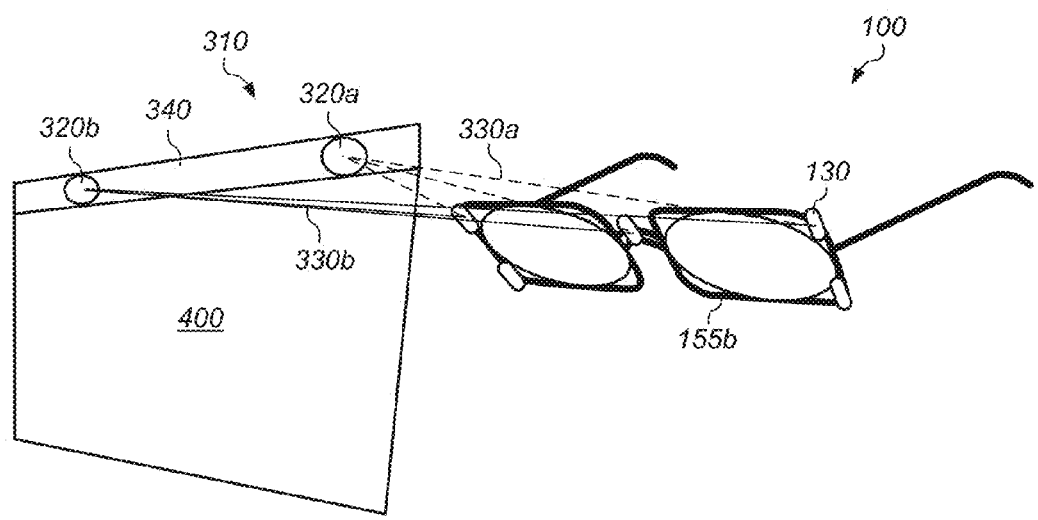
FIG. 3 depicts a diagram of a perspective view of an embodiment of a system for tracking a head of a user relative to a display system wherein light is detected emanating from only some of the emitters.
Figure 4:
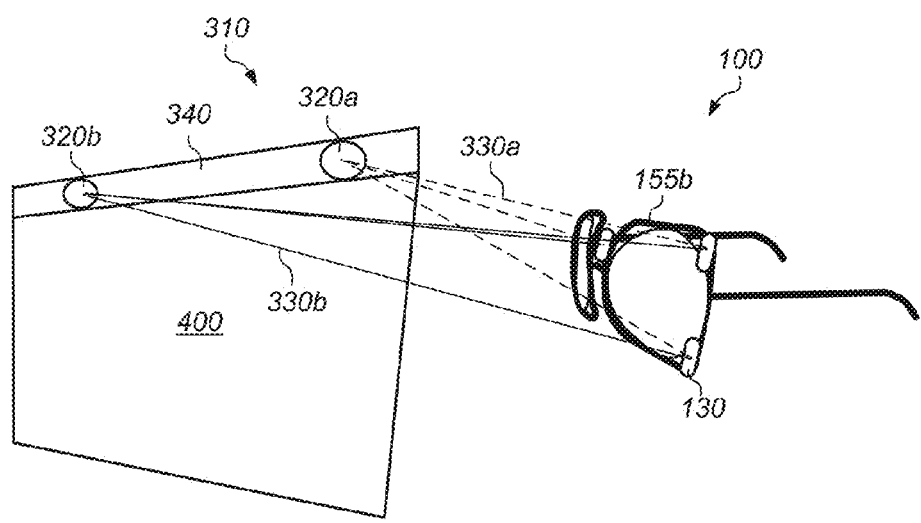
FIG. 4 depicts a diagram of a perspective view of an embodiment of a system for tracking a head of a user relative to a display system wherein light is detected emanating from only some of the emitters.

First side 110 may have a width 140 and a height 150. In some embodiments, the width may be greater than the height. In some embodiments, the tracking device may include a pair of glasses. FIG. 1 depicts a diagram of a perspective view of an embodiment of tracking device 100 for tracking a head of a user relative to a display system. FIG. 1 depicts a tracking device set of eyewear used by the user with a stereo three dimensional display with head tracking. The eyewear includes a frame (155*a* and 155*b*) and within the frame is a light absorbing region (170*a*, 170*b* and 170*c*). FIGS. 2-4 depict a diagram of a perspective view of an embodiment of a system 300 for tracking a head of a user relative to a display system 400. For further descriptions of a stereo display head/eye tracking system, that enables the display to convey a scene or image (in mono or stereo) based on the real time position/orientation (and changing position/orientation) may be found in U.S. patent application Ser. No. 11/141,649 entitled "MULTI-PLANE HORIZONTAL PERSPECTIVE DISPLAY" filed May 31, 2005, U.S. patent application Ser. No. 12/797,958 entitled "PRESENTING A VIEW WITHIN A THREE DIMENSIONAL SCENE" filed Jun. 10, 2010, U.S. Patent Application No. 61/426,448 entitled "THREE-DIMENSIONAL TRACKING OF OBJECTS IN A 3-D SCENE" filed Dec. 22, 2010, U.S. patent application Ser. No. 13/019,384 entitled "MODIFYING PERSPECTIVE OF STEREOSCOPIC IMAGES BASED ON CHANGES IN USER VIEWPOINT" filed Feb. 2, 2011, U.S. Patent Application No. 61/426,451 entitled "COLLABORATION SHARED PRESENCE" filed Dec. 22, 2010, each of which are incorporated by reference herein.

Figure 6:
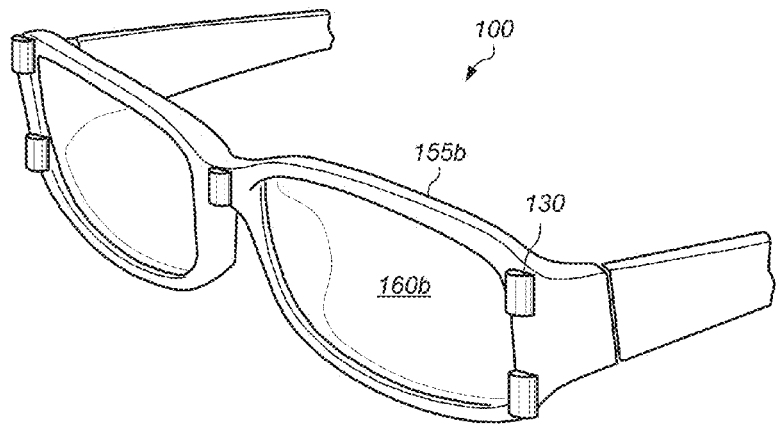
FIG. 6 depicts a diagram of a perspective view of an embodiment of a tracking device for tracking a head of a user relative to a display system.
Figure 7:
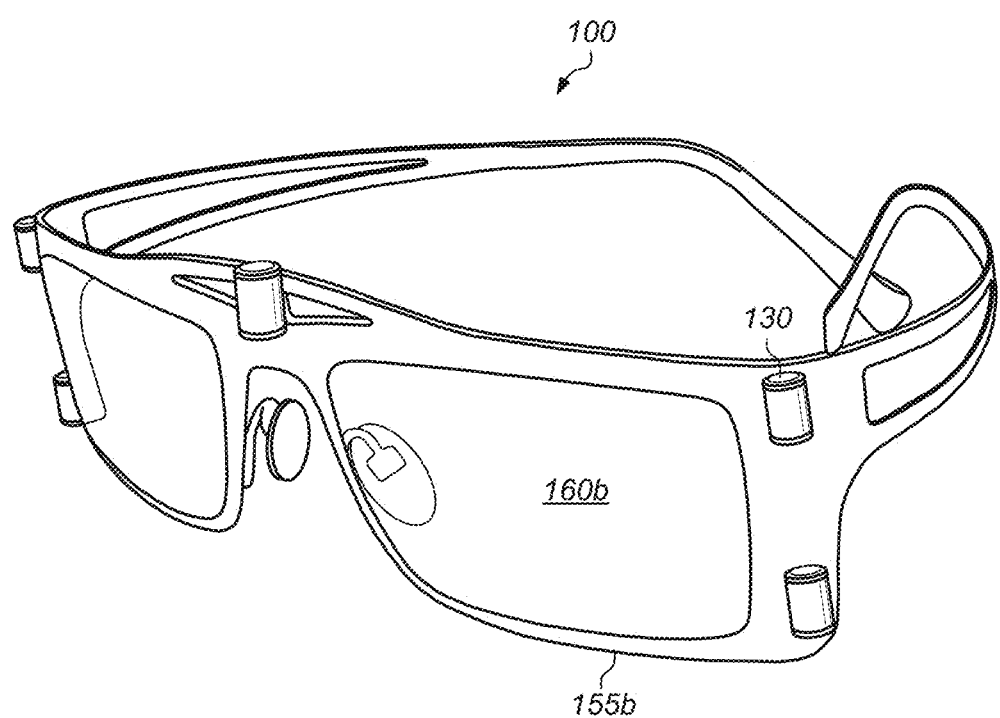
FIG. 7 depicts a diagram of a perspective view of an embodiment of a tracking device for tracking a head of a user relative to a display system.

In some embodiments, the at least three emitters may include at least five emitters. The plurality of emitters 130 may include first emitter 130*a*, second emitter 130*b*, third emitter 130*c*, fourth emitter 130*d*, and fifth emitter 130*e*. The first emitter may be positioned towards an upper right side of the first side of the tracking device. The second emitter may be positioned towards an upper left side of the first side of the tracking device. The third emitter may be positioned towards a lower right side of the first side of the tracking device. The fourth emitter may be positioned towards a lower left side of the first side of the tracking device. The fifth emitter may be positioned substantially between the first emitter and the second emitter (e.g., on a bridge piece of a pair of eyewear). In some embodiments, the emitters may be located within a single plane. This may be due to the first side of the tracking device being substantially planar (e.g., as depicted in FIG. 6). In some embodiments, at least some of the emitters may not lie within a single plane. This may be due to at least the first side of the tracking device being substantially curved (e.g., as depicted in FIG. 7).

In some embodiments, the tracking device uses emitters placed as far apart as possible within the tracking device. Emitters may be positioned with as great a distance between each other to avoid interference with specular reflections which may increase accuracy of the system. This way as the user's head is turned in relation to a sensors, there will most likely still be at least three emitters able to produce a signal that would be sensed by the sensor(s). Distance between the emitters may increase assurance in angle measurement.

In some embodiments, a tracking device may include eyewear. Within the light absorbing regions surrounding the emitters may be lenses (160*a* and 160*b*) of the eyewear, which may reflect the light emanating from the light source and/or other spurious light resulting in specular reflections.

In some embodiments, an emitter may emit light. The emitter may emit infrared light. The emitter may emit light of any wavelength of range of wavelength which may be detected by a sensor. In some embodiments, the emitter may emit a wavelength of light which does not fall within the visible spectrum of light. Emitters that emit wavelengths of light outside the visible spectrum may do so such that a user wearing the tracking device is not distracted by visible light being projected by the emitters. In other embodiments, an emitter may project a signal other than light (e.g., radio waves, etc.).

In some embodiments, the light projected from the emitter is reflected light. Reflecting light off of the emitters may have several advantages over an emitter which acts as a source of a projected signal (e.g., infrared light). An advantage includes that the tracking device does not require any kind of power source for the emitters since the emitters are passive reflectors of signals. Certainly a complexity of the emitter and the tracking device is reduced, facilitating manufacture and reducing costs associate with development and manufacture. Emitters reflecting signals may facilitate future upgrades in that different signals may be reflected off of the emitters as advancements or changes or made such that the tracking device does not have to be changed out (although the emitters themselves may have to).

The first side of the tracking device may include a signal (e.g., light) absorbing material 170 at least substantially surrounding at least one of the emitters. These signal absorbing regions insure that, for example, light hitting these regions does not reflect or is at least inhibited from reflecting. In some embodiments, the light used is IR light in that an IR light source projects IR light towards the tracking device and is reflected back. In this embodiment, the light absorbing regions are IR light absorbing regions. Within the light absorbing regions emitters may be positioned that are intended to reflect the light emanating from the signal source. In some embodiments, all or at least a majority of a first side of the tracking device may be coated and/or formed from a signal absorbing material. In some embodiments, only a portion of a surface surrounding an emitter on a tracking device is configured to absorb a signal which the emitter is configured to reflect.

In some embodiments, the amount of light reflected from a surface depends on the smoothness of the surface (i.e., a smooth surface reflects more light than a rough surface, and a rough surface may reflect more diffusely than a smooth surface). The amount of light absorbed may depend on the color of the surface (i.e., dark colored surfaces absorb light better than light colored surfaces). For example, rough, black surfaces may absorb visible light best of all.

An angle at which light strikes the object has an effect on the amount of light absorbed and/or reflected. If the light strikes the surface normal to the surface or at a 90 degree angle to the surface plane, absorption is favored and reflection less favored. If the light strikes the surface at a low angle, reflection is favored over absorption (depends on the Brewster angle and index of the material).

The signal one wishes to absorb naturally will dictate the method or system used to absorb the signal. For example infrared radiation is not necessarily absorbed by the same materials that absorb visible light.

Figure 5:
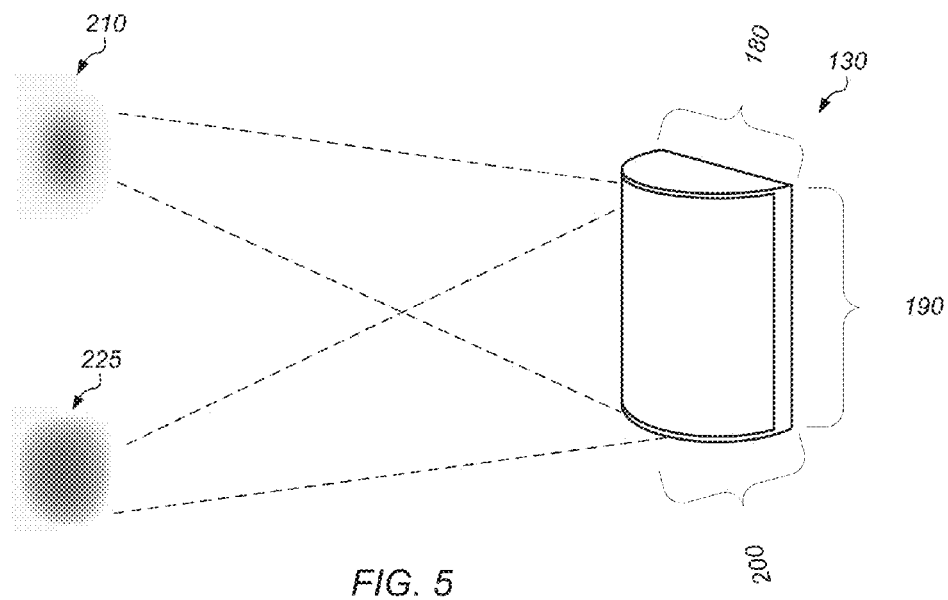
FIG. 5 depicts a diagram of a perspective view of an embodiment an emitter and a light emitter projecting light on the emitter and a detected light/reflection.

In some embodiments, an emitter may include a width 180, a height 190, and a depth 200 as depicted in FIG. 5. The depth may be such that the emitter extends away from the first side of the tracking device. At least one of the emitters may include a substantially cylindrical, spherical, and/or hemi-spherical shape. FIG. 5 depicts a diagram of a perspective view of an embodiment of cylindrical emitter 130 and a light emitter 210 projecting light on the emitter and a detected light/reflection blob 225. In some embodiments, the emitters are cylindrical such that when a signal reflects off the emitters, they may appear as a circular blob to a sensor. This may assist when the tracking device turns relative to the light emanating source and/or sensors, so the reflection at different angles are still seen by the sensor(s) as circular blobs. Further the emitters may be of a known size, which may be programmed into the sensor processor enabling the sensor processor to better identify the true intended reflections from spurious reflections (e.g., from lenses in a tracking device). With the cylindrical shape of the extended emitters, turning of a user's head relative to sensors would still allow the emitters to be sensed by the sensor(s) independent of eyewear curvature (for example, a more stylized eyewear tracking device) or minor obstructions (e.g. the user's nose). FIGS. 6 and 7 depict a diagram of a perspective view of embodiments of tracking devices 100 with cylindrical emitters 130 for tracking a head of a user relative to a display system. The tracking devices in FIGS. 6 and 7 depict different styles of eyeglasses frames. At least one of the emitters may include a substantially elliptical shape. At least one of the emitters may include a substantially spherical, and/or hemi-spherical shape.

In some embodiments, the emitters may be couplable to the first side of the tracking device such that a user may decouple the emitters from the first side. Emitters may be removable from the tracking device. A user or qualified technician may be able to attach, remove, and/or replace emitters on a tracking device. Replaceable emitters may allow for replacement of soiled and/or defective emitters with new functioning emitters. Replaceable emitters may allow for replacement with newer more effective and/or redesigned emitters. Removable emitters may allow more than one user to wear a tracking device, wherein a first user wears a tracking device with emitters and a second user wears a tracking device without emitters (e.g., emitters have been removed by the second user). In some embodiments, only one user of a plurality of users may wearing a tracking device and watching a display system may have emitters coupled to their tracking device, such that a detection system does not have to contend with more than one set of emitters competing with each other and potentially confusing the detection system with how to adjust the display system with respect user(s). The second user may wear a tracking device for other benefits besides being tracked (e.g., using lenses in the tracking device to view three dimensional images created by the display system).

In some embodiments, emitters may be couplable to a tracking device using a number of known common coupling methods. In some embodiments, an emitter may be coupled to a tracking device using an adhesive. The adhesive may be strong enough to couple an emitter to a tracking device for extended periods of time. The adhesive may not be so strong that a user may not be able to later decouple the emitter from the tracking device for reasons described herein. In some embodiments, an emitter may be coupled to a tracking device using a hook and loop coupling system. In some embodiments, an emitter may be coupled to a tracking device using a one or more magnets. In some embodiments, an emitter may be coupled to a tracking device using a friction fit system.

In some embodiments, a plurality of emitters may be coupled to a tracking device as a single unit. For example, in an embodiment where there are five emitters coupled to a tracking device, the five emitters may be coupled to a single member which is itself couplable to the tracking device. In such embodiments, a single member facilitates coupling and removing emitters by a user, instead of having to remove/couple multiple emitters, as well as keep track of them when decoupled. The member may be coupled to the tracking device using at least any of the methods discussed herein with relation to coupling the emitters to the tracking device.

In some embodiments, a system may include detection system 310. The detection system may be associated with a display system 400. Display system 400 may include a three-dimensional display system. The display system may include a display device. The display device may image, during use, a first stereo image conveying a three dimensional scene ("Stereo Image"). The system may include an image processor. The image processor may generate, during use, the first Stereo Image. In some embodiments, the first Stereo Image may be from a first perspective. The detection system may include sensors 320 which detects, during use, signal 330 (e.g., light). The detection system may include at least two sensors (e.g., 320*a* and 320*b*) which detect signals (e.g., 330*a* and 330*b* respectively) projected by emitters 130. Having at least two sensors may allow for the accurate assessment of a depth or z-distance of the emitters with reference to the display system. A depth may be assessed using triangulation. In some embodiments, sensors may include cameras, photo detectors, electronic sensors, CMOS, or CCD sensors, etc. The detection system may include a processor. The processor may be electrically coupled to the sensor. Having at least two sensors may allow geometric triangulation of emitters detected by the sensors using the processor. In some embodiments the processor(s) and sensor(s) may housed in single device 340 which is then coupled to a display system. The sensors may be coupled to the display system such that the position/orientation of the display system relative to the sensors is known such that the processor is able to assess the position orientation of the tracking device relative to the display system. In some embodiment, the display system may be positioned independently from the tracking device and the user of the tracking device, in that a tracking system may not be necessary for a display system which is wearable or coupled to the user. In some embodiments, the sensor(s) and the processor(s) may be housed in separate devices. In some embodiments, substantially all portions of a system may be housed in a single device (including a projection device, but excepting for the tracking device itself).

In some embodiments, the processor may assess, during use, if the first side of the tracking device is directed towards the display system and a position of the first side of the tracking device relative to the display system when the first side of the tracking device is directed towards the display system. The processor may assess, during use, the first side of the tracking device is directed towards the display system when the sensor detects light emitting from at least three of the emitters (e.g., five as depicted in FIGS. 3-4). In some embodiments, the processor may assess, during use, the first side of the tracking device is directed towards the display system when the sensor detects a signal (e.g., light) emitting from all of the emitters (e.g., five as depicted in FIG. 2)

positioned on a tracking device. The processor may be programmed with a minimum numbers of emitters which must be detected before proper position/orientation information may be determined, which in turn may determine the image projection projected by the display system. In some embodiments, a minimum number of emitters may include at least three emitters. At least three of the emitters may be non-collinear. Three non-collinear points define a plane in space and allow a processor to assess a position/orientation of the surface to which the non-collinear emitters are coupled.

In some embodiments, the detection system may include a signal emitter which projects a signal such that the signal is reflected, during use, from at least one of the emitters. In some embodiments, the signal emitter includes a light emitter (e.g., infrared light, etc.). In some embodiments, a signal emitter may be positioned adjacent a sensor. One or more signal emitters may be positioned substantially adjacent each sensor. Sensors from the detection system may then detect the reflected light. The emitters may be of a size that is known (programmed into) to the detection system such that the detection system is able to assess the likelihood that a detected reflection is from the emitter(s) or from some spurious source (e.g., specular reflections such as reflections from lenses positioned in the tracking device). In some embodiments, the emitters may be placed within the borders of a first side of eyeglass frame 155 of tracking device 100, such that there is a segment of the light absorbing material between the reflectors and the lenses of the tracking device. This way the detection system may sense more light reflections than that of the emitters, but with the light absorbing regions between the emitters and the lenses, there is a greater likelihood of distinguishing reflector light and unintended light reflected off the lenses, for example.

In some embodiments, the emitters may be placed on the boundary region of the eyewear with a light absorbing region between the emitters and the eyewear lenses to provide a more distinct demarcation between the intended reflections from the emitters and the spurious one (e.g., from the lenses). In one embodiment the lenses may be absorbing in the general wavelength of the light source to establish a more distinct contrast for the sensor and detection system.

In some embodiments, a system may include a surface including at least three emitters. More than three emitters (e.g., 4, 5, or 6 emitters) may be used to provide further validate of an assessed position/orientation of the surface. The surface may be positionable, during use, with reference to the display device, where the display device is correlated to the sensors. In some embodiments, the surface may be positioned with at least 6 degrees of freedom of movement proximate to the display device. The system may include at least two sensors. At least two sensors may be coupled to the display device in a known position and orientation with reference to the display device. At least two of the sensors may detect, during use, light received from at least three of the emitters as light blobs when the light blobs from the at least three emitters of the surface are detected substantially in proximity to the display device during use.

The processor may assess, during use, a referenced position of the detected light blobs using a bounding function (e.g., convex hull) for each of at least two of the sensors (doing this may assist in excluding many spurious blobs resulting from specular reflections). The processor may correlate, during use, the assessed referenced position of the detected light blobs for each of at least two of the sensors such that a position/orientation of the surface with reference to the display device is assessed. In some embodiments, when the processor correlates the assessed referenced position of the detected light blobs the processor may identify a first emitter along a perimeter determined by the bounding function by assigning a first detected light blob closest to a predetermined first portion of the perimeter (e.g., lower left corner of the convex hull). The processor may employ an algorithm which follows in a first direction away from the first emitter along the perimeter assessing relative angles formed by adjacent detected light blobs along the perimeter such that a second emitter is identified. The processor may identify an at least third emitter along the perimeter with reference to the identified first and second emitter.

In some embodiments, the processor may verify the assessed referenced position of the detected light blobs per sensor by comparing the assessed relative position of the detected light blobs to a database of different configurations of emitter light blobs.

Figure 8:
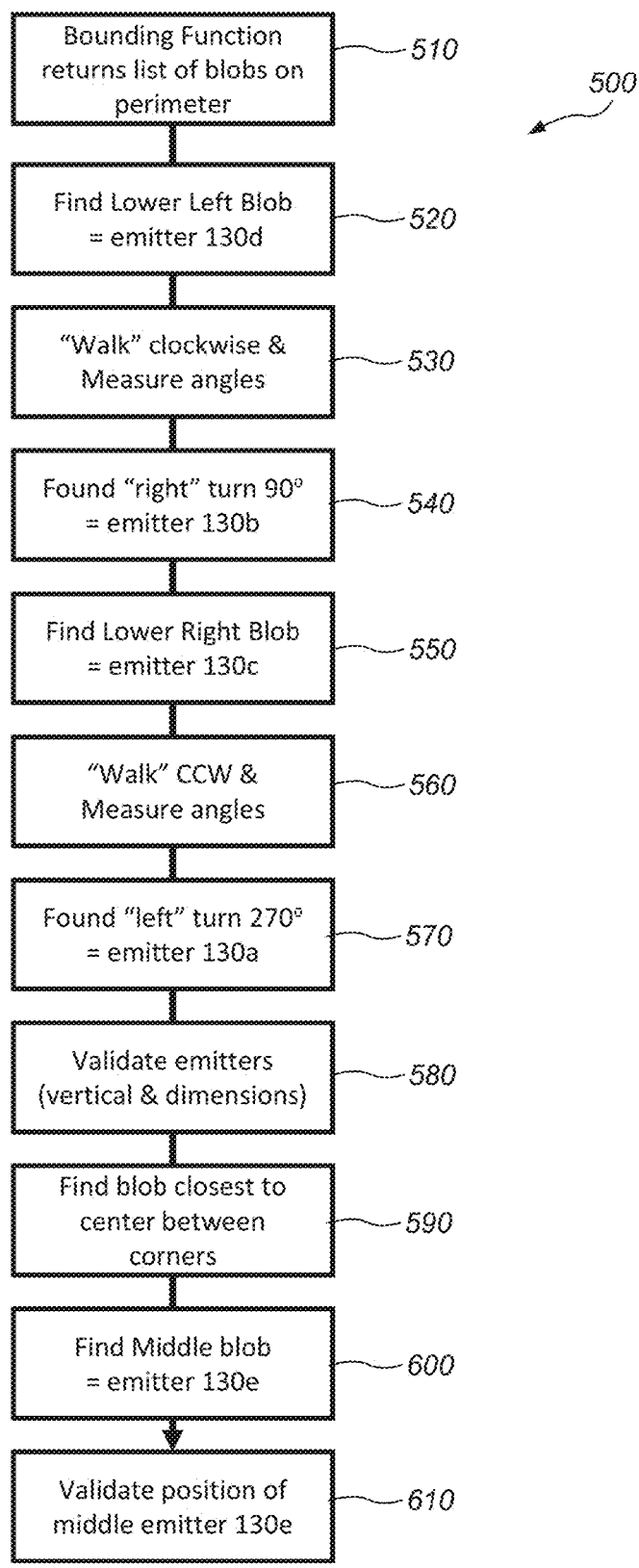
FIG. 8 depicts a diagram of a flow chart of an embodiment of a heuristic correspondence for a tracking device for tracking an object referenced to a display system.

FIG. 8 depicts a diagram of a flow chart of an embodiment of a heuristic correspondence method 500 for a tracking device for tracking an object referenced to a display system. The processor may use the method to identify emitters and the emitter's position and orientation. Correspondence method 500 may be directed towards an embodiment with five emitters (e.g., as depicted in FIG. 1), but may be expanded to include more or fewer (at least three) emitters. A bounding function (e.g., convex hull) may produce 510 a list with all the blobs on the periphery of an image produced by a sensor. The blobs may correspond to the emitters in the image from the sensor plus any spurious blobs due to specular reflections (e.g., from lenses). The bounding function may function eliminate at least some of extraneous blobs due to specular reflections.

Method 500 may include identifying 520 a lower left blob on the image and labeling the blob as lower left emitter 130*d* on the glasses. The method may include moving 530 around the convex hull indices in clockwise fashion and compute angles amongst adjacent blobs. When one finds a "right turn" or 90 degree angle 540 amongst three adjacent blobs, then the processor declares that blob the upper left blob and it is labeled emitter 130*b*. For the right side of the glasses the processor used the method to find the lower right blob 550 and label this blob emitter 130*c*. The method may include moving 560 around the convex hull indices in counter-clockwise fashion and compute angles amongst adjacent blobs. When one finds a "left turn" or 270 degree angle 570 amongst three adjacent blobs, then the processor labels that blob the upper right blob and it is labeled emitter 130*a*.

Heuristic correspondence method 500 may include validating 580 the identification of the left and right side emitters. Validation may include comparing the relative position of the two emitters on the left side to one another as well as doing the same for the right side emitters. For example, the left blobs ought to be roughly vertical and the right blobs ought to be roughly vertical. In some embodiments, the method may include validating the assessed referenced position of the detected light blobs by comparing the assessed referenced position of the detected light blobs to a database of different configurations of emitters. If both left and right corner blobs (e.g., emitters 130*b* and 130*a*) are valid, then a blob is roughly positioned at the geometric center between the corner reflectors 590. The middle blob may be labeled 600 as emitter 130*e*. Final validation 610 of position of middle emitter 130*e* may be achieved by comparing with known dimensions of object and blob locations.

In some embodiments, one may roughly estimate position by extrapolating from known blob locations & known object (e.g., glasses) size.

Method 500 or similar methods may be performed using a heuristic algorithm that corresponds the detected blobs to known geometric arrangements of emitters on the tracked surface, such that which blob corresponds to which emitter is identified. Upon the system identifying at least three non-collinear emitters, the system is able to assess the spatial coordinates (e.g., X, Y, and Z) for the identified emitters using geometric triangulation from at least two sensors. Once the spatial coordinates of the at least three non-collinear emitters is ascertained the pitch, yaw, and roll may be assessed.

In some embodiments, the processor may assess, during use, a position/orientation of a head to which the surface is coupled to using the assessed position/orientation of the surface with reference to the display device, and wherein the processor assesses, during use, a viewpoint using the assessed position/orientation of the head to assess a second perspective for use by the image processor to assist in generating the second Stereo Image.

The image processor may generate, during use, a second Stereo Image using the assessed position/orientation of the surface with reference to the display device. In some embodiments, the first Stereo Image generated may be from a first perspective. The first Stereo Image may be distinct from the second Stereo Image wherein the second Stereo Image may be derived from a second perspective, that correlating to the second head position, which is in respect to the second surface position/orientation. In some embodiments, the first Stereo Image may be generated using a first assessed position/orientation of the surface with reference to the display device and the second Stereo Image may be generated using a second assessed position/orientation of the surface with reference to the display device. Stereo Images may be continuously generated during use with each Stereo image derived from a new assessed position/orientation of the surface with reference to the display device.

In another embodiment, the detection system may assess the outer perimeter of a blob field. This outer perimeter may form the convex hull that is used to qualify the perimeter and hence the boundary from which to register the intended blobs. With the convex hull, the spurious blobs detected within the convex hull are assumed to be spurious reflections and not those that are used to determine position and/or orientation information of the user's tracking device. To help reduce the likelihood of spurious blobs emanating from the lenses, the lenses may be curved to disperse the light reflections thereby reducing the likelihood of strong blobs emanating from the lenses of the tracking device. By having, in some embodiments, one reflector dot on the nose bridge and two each on the top and bottom outer edges of each lens, the head tracking system has better recognition of the eyewear position.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for tracking with reference to a three-dimensional display system, comprising:
  a display device configured to image a first stereo three-dimensional image;
  a surface configured to be positioned with reference to the display device, wherein the surface comprises at least three emitters;
  at least two sensors coupled to the display device and configured to detect light received from the at least three of emitters, wherein the at least two sensors are at a known position and orientation referenced to the display device;
  a processor coupled to the at least two sensors, wherein the processor is configured to:
    assess a referenced position of the detected light;
    correlate the assessed referenced position of the detected light for each of the at least two sensors such that a first position/orientation of the surface with reference to the display device is assessed; and
  an image processor configured to generate the first stereo three-dimensional image using the assessed first position/orientation of the surface with reference to the display device; and
  wherein the first stereo three-dimensional image is from a first perspective, and wherein the first stereo three-dimensional image is distinct from a second stereo three-dimensional image which is derived from a second perspective using a second assessed position/orientation of the surface with reference to the display device.

2. The system of claim 1,
  wherein the surface comprises at least 6 degrees of freedom of movement proximate to the display device.

3. The system of claim 1,
  wherein the surface comprises at least four emitters, and wherein the at least two sensors are further configured to detect light received from at least three of the at least four emitters.

4. The system of claim 1,
  wherein at least a portion of the surface adjacent to at least one of the emitters absorbs light.

5. The system of claim 1,
  wherein the surface forms at least a portion of a device which couples to the head of a user.

6. The system of claim 1,
  wherein the surface forms at least a portion of a pair of glasses which couple to the head of a user.

7. The system of claim 1,
  wherein the emitters at least partially extend from the surface.

8. The system of claim 1,
  wherein at least one of the emitters comprises a substantially cylindrical, spherical, and/or hemi-spherical shape.

9. The system of claim 1,
wherein the at least two sensors are further configured to detect infrared light projected from the at least three emitters.

10. The system of claim 1,
wherein the at least two sensors are further configured to detect light reflected from the at least three emitters.

11. A non-transitory computer readable memory medium storing program instructions executable by a processor to:
detect, via at least two sensors coupled to the display device, light received from at least three emitters comprised on a surface positioned with reference to the display device, wherein the at least two sensors are at a known position and orientation with reference to the display device;
assess a referenced position of the detected light;
correlate the assessed referenced position of the detected light for each of the at least two sensors such that a first position/orientation of the surface with reference to the display device is assessed;
generate, via an image processor, a first stereo three-dimensional image on the display device using the assessed first position/orientation of the surface with reference to the display device;
wherein the first stereo three-dimensional image is from a first perspective, and wherein the first stereo three-dimensional image is distinct from a second stereo three-dimensional image which is derived from a second perspective using a second assessed position/orientation of the surface with reference to the display device.

12. The non-transitory computer readable memory medium of claim 11,
wherein the program instructions are further executable to:
generate, via the image processor, the second stereo three-dimensional image on the display using the assessed second position/orientation of the surface with reference to the display device.

13. The non-transitory computer readable memory medium of claim 11,
wherein the surface forms at least a portion of a device which couples to the head of a user.

14. The non-transitory computer readable memory medium of claim 11,
wherein the surface forms at least a portion of a pair of glasses which couple to the head of a user.

15. The non-transitory computer readable memory medium of claim 11,
wherein at least one of the emitters comprises a substantially cylindrical, spherical, and/or hemi-spherical shape.

16. The non-transitory computer readable memory medium of claim 11,
wherein the at least two sensors are further configured to detect infrared light projected from the at least three emitters.

17. The non-transitory computer readable memory medium of claim 11,
wherein the at least two sensors are further configured to detect light reflected from the at least three emitters.

18. A method for tracking with reference to a three-dimensional display system, comprising:
detecting, via at least two sensors coupled to the display device, light received from at least three emitters comprised on a surface positioned with reference to the display device, wherein the at least two sensors are at a known position and orientation with reference to the display device;
assessing a referenced position of the detected light;
correlating the assessed referenced position of the detected light for each of the at least two sensors such that a first position/orientation of the surface with reference to the display device is assessed;
generating, via an image processor, a first stereo three-dimensional image on the display device using the assessed first position/orientation of the surface with reference to the display device;
wherein the first stereo three-dimensional image is from a first perspective, and wherein the first stereo three-dimensional image is distinct from a second stereo three-dimensional image which is derived from a second perspective using a second assessed position/orientation of the surface with reference to the display device.

19. The method of claim 18, further comprising:
generating, via the image processor, the second stereo three-dimensional image on the display using the assessed second position/orientation of the surface with reference to the display device.

20. The method of claim 18,
wherein the surface forms at least a portion of a pair of glasses which couple to the head of a user.

\* \* \* \* \*